United States Patent [19]

Muhlfelder et al.

[11] 4,424,948
[45] Jan. 10, 1984

[54] MAGNETICALLY TORQUED NUTATION DAMPING

[75] Inventors: Ludwig Muhlfelder, Livingston; Kevin J. Phillips, Hightstown, both of N.J.; Steven L. Blasnik, Cambridge, Mass.

[73] Assignee: RCA Corporation, New York, N.Y.

[21] Appl. No.: 227,343

[22] Filed: Jan. 22, 1981

[51] Int. Cl.³ .......................... B64G 1/32; B64G 1/38
[52] U.S. Cl. .................................... 244/166; 244/170
[58] Field of Search ............... 244/166, 170, 176, 165, 244/169; 318/584, 585; 364/459

[56] References Cited

U.S. PATENT DOCUMENTS

| | | | |
|---|---|---|---|
| 3,558,078 | 1/1971 | Lanzaro | 244/169 |
| 3,643,897 | 2/1972 | Johnson | 244/176 |
| 3,834,653 | 9/1974 | Perkel | 244/166 |
| 3,937,423 | 2/1976 | Johansen | 244/169 |
| 3,944,172 | 3/1976 | Becker | 244/169 |
| 3,977,633 | 8/1976 | Keigler et al. | 244/169 |
| 3,984,071 | 10/1976 | Fleming | 244/169 |
| 3,997,137 | 12/1976 | Phillips | 244/169 |
| 4,062,509 | 12/1977 | Muhlfelder | 244/166 |

OTHER PUBLICATIONS

"Magnetic Attitude Control of a Momentum-Biased Satellite in Near-Equitorial Orbit", P. S. Goel et al., J. Guidance and Control, Jul.-Aug. 1979.

Primary Examiner—Galen L. Barefoot
Attorney, Agent, or Firm—Joseph S. Tripoli; Robert L. Troike

[57] ABSTRACT

A system for actively damping nutation of a satellite and/or aligning the pitch axis of a momentum bias satellite with some external reference includes a magnetic torquing means which is energized with currents of appropriate polarity and magnitude to effect the necessary torque to reduce nutation. A roll sensor produces signals proportional to the roll error of the satellite. A control signal is generated a predetermined time period after the roll error exceeds a predetermined threshold. The predetermined time period is a fraction x of the nutation period $t_n$ of the satellite or $x+n(t_n)$ where n is an integer.

9 Claims, 7 Drawing Figures

MAGNETICALLY TORQUED NUTATION DAMPING

This invention relates to systems for controlling spacecraft nutation, particularly for spacecraft using magnetic attitude control systems.

A problem frequently encountered in spacecraft is undesirable nutation or coning motion of the craft. Nutation may be induced by a torque directed along an axis which is perpendicular to the momentum vector of the spacecraft. This torque can be caused by magnetic interactions between the spacecraft and earth's magnetic field, thruster firings, and acceleration or deceleration of rotating components within the spacecraft. The nutation inducing torque always has a component at right angles to the spacecraft's total momentum vector and, when integrated with respect to time, is referred herein as the transverse momentum vector. Many systems have been proposed heretofore for controlling such undesirable spacecraft nutation. Some prior control art uses a combination of passive elements arranged to dissipate the undesirable spacecraft nutation. Other prior control art counteracts spacecraft nutation by the use of an internal torque provided by rotating components or by an external torque generated by spacecraft thrusters activated by electrical signals from sensors which detect spacecraft nutation.

Utilization of special nutation counteracting thrusters or rotating components and sensors or of passive elements arranged solely for the dissipation or damping of spacecraft nutation, while effective, increases the complexity and weight of spacecraft control system. There is, therefore, still a need for further improvement in nutation damping design.

A system employing magnetic torquing for nutation damping is described by S. Goel, et al. in an article entitled, "MAGNETIC ATTITUDE CONTROL OF A MOMENTUM-BIASED SATELLITE IN NEAR EQUITORIAL ORBIT" in the July–August, 1979 issue of *Journal of Guidance and Control* (Vol. 2, No. 4). In this system, the earth sensor signals are applied to a low pass filter designed to pass orbital frequency signals and a high pass filter designed to pass nutational frequency signals. The low pass and high pass frequency signals are used to generate separate proportional torques which are applied by an electromagnet along the roll axis of the satellite. The required logic substantially increases the complexity of the satellite attitude and/or orbit control system.

In accordance with one embodiment of the present invention, a system for actively damping nutation and/or aligning the pitch axis of a momentum stabilized satellite with some external reference, includes a magnetic torquing means which is energized with currents of appropriate polarity and magnitude to effect the necessary torque to reduce directly and simultaneously both roll and yaw attitude errors and also nutation. Sensor means produce signals which are proportional to an attitude error of the satellite. Control means generates a control signal delayed by a predetermined time period after the attitude error exceeds a predetermined threshold and maintains said control signals for a period of time following said attitude error changing its polarity. The time period is proportional to the nutation period of the satellite.

In accordance with the preferred embodiment of the present invention described herein, nutation damping is achieved by modifying a presently used magnetic torquing system such as described in U.S. Pat. No. 3,834,653, issued to RCA Corporation based on the invention of Harold Perkel, entitled, "Closed Loop Roll and Yaw Control for Satellites," or U.S. Pat. No. 4,062,509 issued Dec. 13, 1977 to RCA Corporation based on the invention of Ludwig Muhlfelder, et al entitled, "Closed Loop Roll/Yaw Control System for Satellites," and incorporated by reference herein. The modification as will be described in more detail later is that of a predetermined delay which is theoretically a function of the nutation period of the spacecraft. Before discussing the system, there is provided a brief description of how the magnetic torquing system for attitude control provides nutation damping followed by a description of how (by providing the delay) the attitude control system can be modified to provide the nutation damping.

Figure 1:
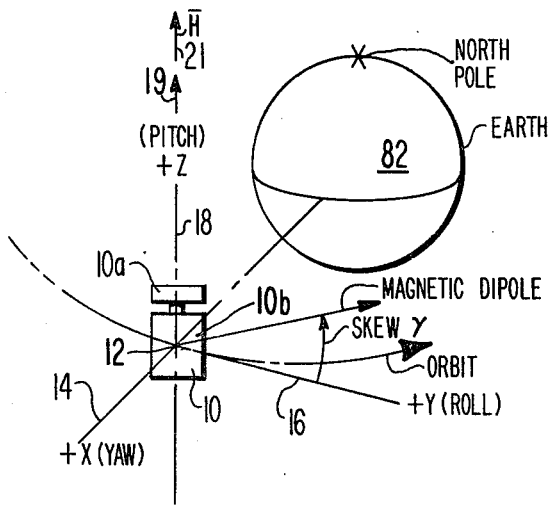
FIG. 1 is a diagram illustrating the three axes of a satellite and the vector relationships of the control system.

Referring to the diagram of FIG. 1, there is illustrated for purposes of one example a satellite 10 in the synchronous orbit about the earth 82. This satellite 10 for example consists of a spinning portion 10a and a despun portion 10b. The spinning portion 10a is a rotor or drum or momentum wheel; the despun portion 10b is a platform or main spacecraft body. Such a satellite is referred to herein as a Momentum Bias Satellite. The synchronous orbit is that orbit at an altitude of about 22,000 miles from the surface of the earth which is essentially in the plane of the equator. The body of the satellite 10 is of any suitable size and shape. Extending from the center of mass or center of gravity 12 of the satellite or spacecraft are three mutually perpendicular axes X, Y, and Z corresponding to the conventionally designated yaw 14, roll 16 and pitch 18 axes, respectively. The pitch axis (Z) is defined to be the one in the direction of arrow 19 collinear with the total angular momentum vector of the satellite 10, designated as 21 and normal to the orbit plane when the spacecraft 10 is operating in an equatorial synchronous orbit and there is no nutation and no attitude error. Under these conditions, the pitch axis (Z) is parallel to the spin axis of the momentum wheel 10a and the momentum vector $\overline{H}$.

The sign convention is that the pitch axis pointing north in FIG. 1 is positive and it is in the direction of the positive angular momentum vector $\overline{H}$. According to the prior art the exchange of angular momentum between the spinning portion 10a and despun portion 10b of the spacecraft is controlled to cause the despun platform or spacecraft body 10b to rotate counterclockwise about the pitch axis in order to maintain earth orientation. The yaw (X), the roll (Y) axes are mutually perpendicular and orthogonal to the pitch axis. The axis system is defined and used herein and according to usual convention is right handed in the order of X, Y, and Z. The Z axis at all times is referred to as the pitch axis and the Z axis is parallel to or aligned with the axis of the spinning momentum wheel 10a.

For the synchronous orbit discussed above, the positive angular momentum vector $\overline{H}$ designated as 21 should be parallel to the orbit normal or normal to the orbit plane of the spacecraft.

Magnetic torquing of spin stabilized satellites for attitude control is well known and, as cited above, is described in U.S. Pat. No. 3,834,653, based on the invention of Harold Perkel, entitled, "CLOSED LOOP ROLL AND YAW CONTROL FOR SATELLITES". Another magnetic torquing system as cited above is described in U.S. Pat. No. 4,062,509.

In the Perkel system a magnetic dipole is oriented along the roll axis for a satellite in the geo-synchronous orbit and interacts with the primary magnetic field of the earth which is nominally perpendicular to the orbit plane to produce a magnetic control torque about the yaw axis when the roll attitude exceeds a predetermined threshold. The system described therein includes sensors for sensing the roll errors as the only input parameter of the closed loop system. Attitude sensors in combination with electronic logic energize the magnetic dipole with currents of appropriate polarity and magnitude to interact with the earth's magnetic field to effect the necessary torque to correct the satellite's attitude. The control torque causes the precession about the roll axis which cancels out the roll error. Thus, the magnetic torquer reduces the roll error and by the gyroscopic crosscoupling indirectly controls the yaw error. In accordance with the Muhlfelder, et al patent, U.S. Pat. No. 4,062,509, the magnetic dipole is oriented perpendicular to the satellite's pitch axis in the roll/yaw plane at a predetermined skew angle relative to the roll axis, which acts to minimize the roll and yaw errors in reaction with the earth's magnetic field.

Figure 2:
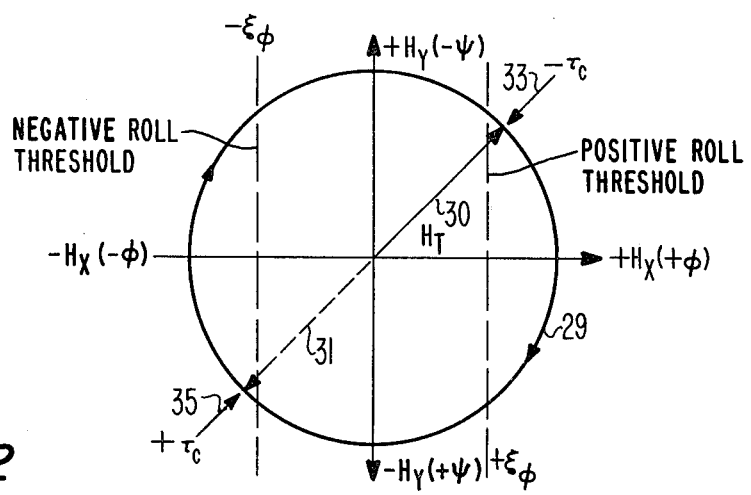
FIG. 2 illustrates the locus of the component of the total angular momentum vector in the orbit plane rotating at orbital frequency with no nutation present. The coordinate system is orbit referenced.

Referring to FIG. 2, there is illustrated the manner in which the control torque generated by these magnetic attitude control systems act on the satellite. The abscissa coordinate in FIG. 2, represents the roll angle $\phi$ (phi) or the transverse momentum about the X axis $H_x$. The ordinate coordinate represents the yaw angle $\psi$ (psi) or transverse momentum about the Y axis. An attitude error exists when the total angular momentum vector $\overline{H}$ (designated 21 in FIG. 1) is not aligned with the orbit normal (not perpendicular to the plane or the orbit). The upper case designation of momentum (H) defines vectorial components in the orbit coordinate frame. A vector $H_T$ in FIG. 2 extending from the center of the axes represents the transverse momentum vector which lies in the equatorial plane for the geosynchronous orbit case. The circle 29 in FIG. 2, represents the locus of the tip of the transverse vector in the orbit plane which rotates at the orbital frequency in the geodetic frame. The circle 29 which represents the locus of the component of the total system angular momentum in the orbit plane rotates in a clockwise direction and crosses positive roll threshold ($\epsilon_\phi$) and negative thresholds ($-\epsilon_\phi$) as indicated by the dashed lines. As the satellite orbits the earth in its nominal 24 hour orbit, a given transverse momentum vector produces in sequence an attitude error in roll, then yaw, then negative roll and then negative yaw. In accordance with the roll and yaw control system in the patents cited above, when the threshold is exceeded, a negative torque ($-\tau_C$) or a positive torque ($+\tau_C$) is produced which reduces the transverse momentum vector $H_T$. For the example of the transverse momentum vector $H_T$ being at that time as indicated by arrow 30 crossing the positive roll threshold $\epsilon_\phi$ a negative torque ($-\tau_C$) is developed in a nominal direction as indicated by vector 33 which opposes the transverse momentum vector. Similarly, when the transverse momentum vector $H_T$ being at that time as indicated by dashed lines 31, exceeds the negative roll threshold ($-\epsilon_\phi$) a positive threshold torque ($+\tau_C$) is developed in a nominal direction as indicated by the vector 35. A positive torque ($+\tau_C$) is one in which the one or more coils producing the magnetic dipole in the X-Y plane of the satellite are biased with currents to produce by interaction with the earth's magnetic field a torque in the positive roll and yaw axes direction. For a negative torque ($-\tau_C$) reverse direction currents are applied to one or more coils to produce a torque in the negative roll and yaw axes direction. The opposition of the control torque $\tau_C$ to the transverse momentum $H_T$ is in terms of quadrant polarity and not necessarily in terms of perfect anti-parallel orientation.

As stated previously, the present invention relates to a damping nutation system using a magnetic torquing system as described in U.S. Pat. Nos. 3,834,653 or 4,062,509. Spacecraft nutation occurs when the pitch axis and the total angular momentum vector $\overline{H}$ are not parallel or aligned and the pitch axis Z of the spacecraft body is actually nutating or coning about the total angular momentum vector and presents a locus of points about the total angular momentum vector.

Figure 3:
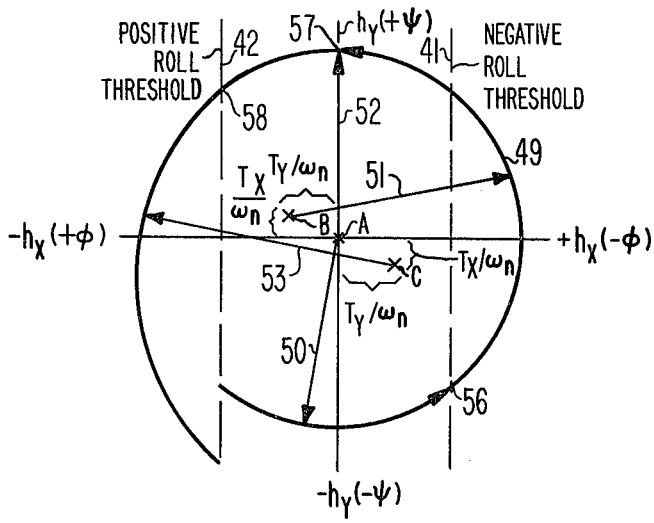
FIG. 3 illustrates the locus of component of total system momentum in the spacecraft body transverse plane, said locus rotating at the nutation frequency in the spacecraft body fixed frame with no true roll (attitude) error present, and with no delay on the control torque. The coordinate system is spacecraft body referenced.

Referring to FIG. 3, the spiral 49 illustrates the locus of the component of the total system momentum in the spacecraft's transverse plane rotating at the nutation frequency in the spacecraft body fixed frame. The abscissa coordinate in FIG. 3, is roll angle $\phi$ or transverse nutation momentum about the X axis ($h_x$) and the ordinate coordinate is the yaw angle $\psi$ or transverse nutation momentum about the Y axis ($h_y$). The lower case designation of momentum (h) defines transverse vectors in the spacecraft body coordinate frame. In the diagram of FIG. 3, the total angular momentum vector is aligned with the orbit normal so that no true roll or yaw attitude error is present. The negative roll threshold ($-\epsilon_\phi$) is illustrated by dashed line 41 and the positive roll threshold ($\epsilon_\phi$) is indicated by dashed line 42 in FIG. 3. It is to be noted that the direction of the locus of the component of the total system momentum of the spacecraft rotates at a nutation frequency in an opposite direction or counterclockwise direction to that of the transverse momentum vector in FIG. 2. With the magnetic control system described above and in U.S. Pat. No. 3,834,653 and 4,062,509, the magnetic control system activates positive X and Y axis torques when the measured roll is negative, as represented in FIG. 2 by torque vector 35. Point A in FIG. 3, represents the pitch axis and the initial center or rotation of the momentum vector 50 about the pitch axis. When the spacecraft nutates to point 56 where the roll sensor signal detects a roll error beyond the negative roll threshold the magnetic control activates the positive torques (+$\tau_C$), consisting of components +Tx and +Ty on the x and y axes, respectively. This torque at this time initially moves the center of rotation of the momentum vector along the positive $h_y$ and negative $h_x$ from point A to point B. This positive torque (+$\tau_C$), energized when the measured roll is negative, increases the nutation to produce the larger transverse momentum vector 51. When the spacecraft nutates to point 57 where the roll error changes sign, the positive torque (+$\tau_C$) is de-energized producing the transverse vector 52 from center point A. When, due to spacecraft nutation, the threshold detector senses crossing of the positive roll threshold at point 58, the magnetic control law for attitude control activates the negative −$\tau_C$ torque consisting of components −Tx and −Ty on the x and y axes, respectively. This moves the center of rotation of the momentum vector 53 along the negative $h_y$ and positive $h_x$ axes to point C. The negative torque (−$\tau_C$) energized when the measured roll is positive further increases the nutation to produce an even larger transverse momentum vector 53. In other words, the application of the control torques according to the described attitude control systems, produces nutation or increases the amount of nutation. As can be seen by viewing FIG. 3, without a separate nutation damper the spacecraft would begin to nutate or increase nutation by the operation of the attitude control system.

In accordance with the present invention, by judicially phasing the magnetic control torques, roll and yaw attitude can be controlled as stated for example in U.S. Pat. No. 3,834,653 while simultaneously providing damping of any nutation. Further, in accordance with the present invention, this judicial phasing of the magnetic control torques can be used to control nutation damping even though the attitude of the spacecraft is correct. An analysis of a momentum bias roll/yaw attitude control system utilizing U.S. Pat. No. 3,834,653 or 4,062,509 reveals that a nutation period is only about one to three minutes. Almost immediately (a few seconds) after the spacecraft nutation causes a detection of a threshold crossing, the transverse momentum is causing the spacecraft to nutate in the opposite direction. The torque then adds to the transverse momentum vector or causes nutation to grow. By the system described herein, the magnetic torques are not applied immediately upon exceeding the positive or negative attitude roll threshold.

In accordance with the teachings herein, the application of torque is delayed for a fraction of the nutation period. In this manner, instead of the magnetic torques being in phase and aiding the nutation, the magnetic torque will be applied out of phase and tend to decrease the nutation.

Figure 4:
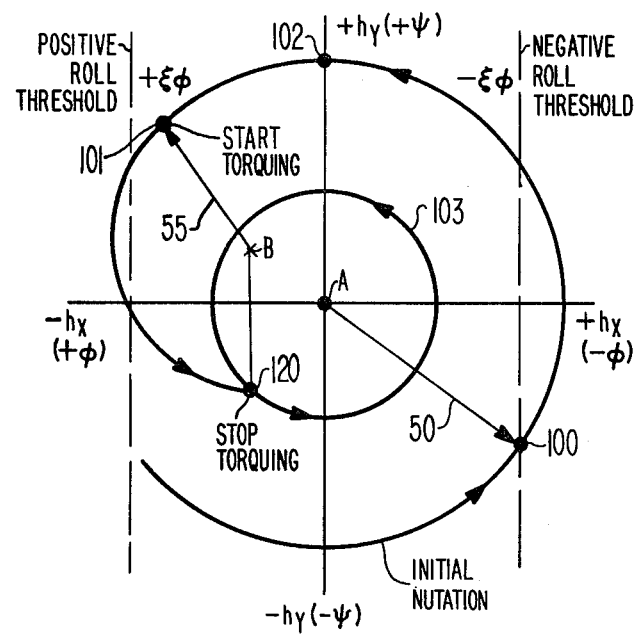
FIG. 4 illustrates the locus of component of total system momentum in the spacecraft body transverse plane rotating at the nutation frequency in the spacecraft body-fixed frame with delayed control torque.

Referring to FIG. 4, there is illustrated how the operation of the system with the delayed torque reduces nutation. FIG. 4 illustrates the locus of the component of the total system momentum in the spacecraft's transverse plane rotating at the nutation frequency. When the negative roll threshold is reached at point 100, with the same transverse momentum vector 50, the magnetic torquing called for (+$\tau_C$) is delayed for a predetermined portion of the nutation period to point 101. The magnetic torquing again moves the center of rotation of the momentum vector from A to point B at the time when the delayed torque +$\tau_C$ is applied. Applying the magnetic torque at this time decreases the length of the transverse momentum vector to that illustrated by vector 55 causing reduction of nutation. The magnetic torquing is normally stopped when the roll error sensor detects a sign change of the roll error. This would be detected at point 102, which is also delayed by the same predetermined portion of nutation period to point 120. By this means the nutation is reduced to the inner circle 103 which is within the desired threshold. Basically, in accordance with the present invention, the torquing is delayed for a fraction of a nutation period such that the resulting torquing decreases the nutation rather than increasing it. The nutation period is short in comparison to the geosynchronous orbital period. For example, the nutation period is only from one to three minutes in a typical satellite configuration. The nutation period is determined by the equation $H/\sqrt{I_x I_y} = \omega_n$ where H is the wheel momentum and $I_x$ and $I_y$ are spacecraft moments of inertia about the x and y axes and $\omega_n$ is the nutation frequency. The geosynchronous orbiting period is, of course, about 24 hours. Therefore, the period of delay in applying a magnetic torque is quite small compared to the geosynchronous orbiting period and therefore the delay in applying the torque for a fraction of the nutation period has no detrimental effects on the roll/yaw attitude control system as described in U.S. Pat. No. 3,834,653, for example. As mentioned previously, the magnetic torque is stopped at a predetermined delay after the zero roll error is sensed or a change in roll sign (at point 120 in FIG. 4).

Figure 5:
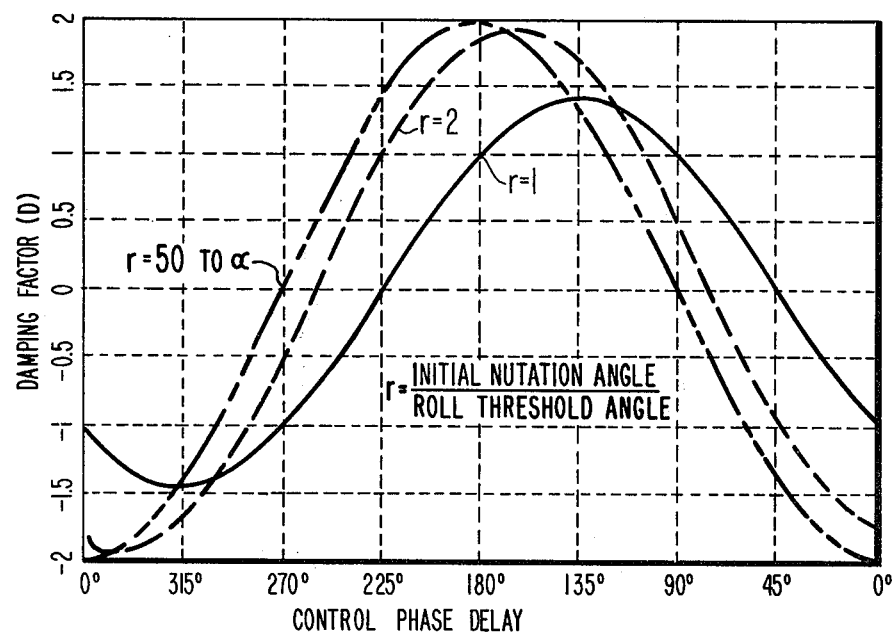
FIG. 5 is a plot of damping factor (D) versus phase delay.

The delay is affected by various factors, as will now be described. FIG. 5 is a plot of damping factor D (normalized +2 as maximum damping, −2 as maximum growth and O as no damping or no growth) versus control phase delay. As can be seen for the large nutation of 50 times the threshold level (or r=50), maximum damping (D=+2) would be provided at one-half nutation period or 180° phase delay. If however, the nutation amplitude were equal to the threshold (r=1), maximum damping would be provided with 135° delay. It has been determined mathematically that the best average damping factor for all r values is achieved by a delay of 163° delay for control torque $\tau_C$ applied on the yaw axis as in U.S. Pat. No. 3,834,653 and the magnetic dipole along roll axis 16 in FIG. 1.

In the system described in U.S. Pat. No. 4,062,509 the control dipole is skewed in the roll/yaw plane at an angle γ from the roll (Y) axis toward the −X yaw axis. The 163° delay discussed previously is based on the dipole being aligned with the roll axis as described in U.S. Pat. No. 3,834,653. It has been determined that to achieve optimum torquing for the system described in U.S. Pat. No. 4,062,509, for every degree of skew angle γ there should be an equal degree of torque delay. In order for the system described previously to operate with a skewed dipole the delay should be 163° plus the dipole skew angle in the roll/yaw plane from positive roll to negative yaw. For example, if there is a skew angle γ of 76° as illustrated in FIG. 1, the recommended phase delay would be 163°+76° (above discussed delay for maximum average damping factor)=239°, or nominally two-thirds of a nutation period.

Figure 6:
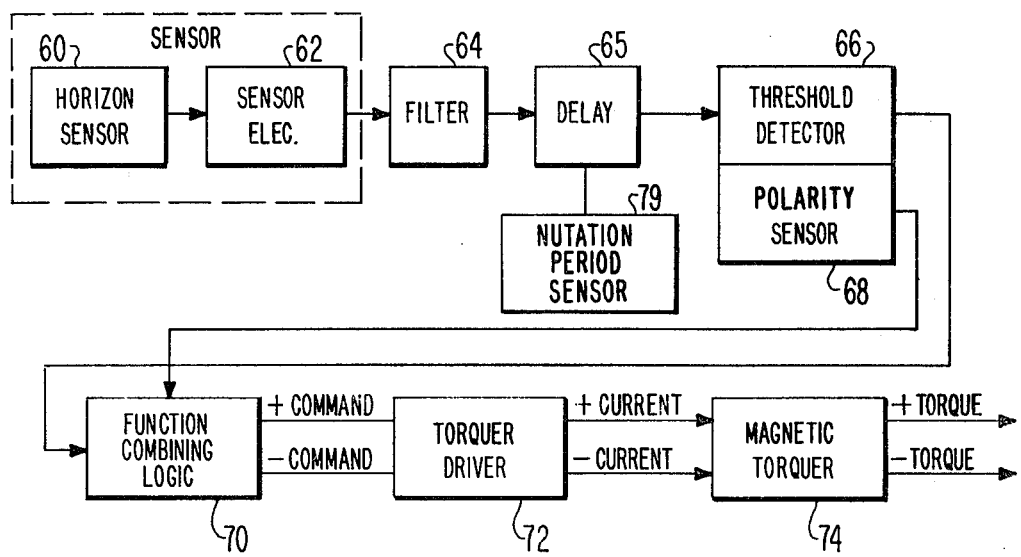
FIG. 6 is a block diagram of a closed loop roll/yaw attitude control system with delay for nutation damping illustrating one form of the invention.

FIG. 6, is a block diagram of one embodiment of the invention in which delays are added to the system described in U.S. Pat. No. 4,062,509. Attitude sensors such as horizon sensor 60 are suitably located on the satellite and respond to energy from the earth's surface. The attitude sensor may be arranged in any suitable manner known in the art, and sensing of satellite attitude may be accomplished by horizon sensors, sun sensors, star sensors, gyroscopes, accelerometers or simple instruments. Typically, a pair of sensors may be arranged to scan the horizon. Sensor electronics 62 are suitably arranged to generate in response to signals from horizon sensor 60 a signal proportional to the roll attitude error $\phi$ of the satellite and the polarity or direction (+ or −) of the roll attitude error. The sensor 60 may be of the V line of sight type sensor, the principles of which are described in a paper of W. Lindlay et al. entitled, "Attitude and Spin Control for TIROS Wheel," Proceedings of AIAA/SACC Guidance and Control Conference, August 1966. Depending upon the specific implementation of horizon sensor 60 and/or sensor electronics 62, the output signal from the sensor electronics could be either an analog waveform or digital words. The output signal from the sensor electronics 62 is filtered by an electronic or digital filter 64 to reduce noise.

The output from filter 64 is applied to delay means 65 which provides the delay for the above-mentioned fraction of the nutation period. Threshold detector 66 compares the filtered and delayed output signals to a given threshold level $\epsilon_\phi$. The threshold level is dependent upon the degree of attitude precision which is required in a satellite. Threshold detector 66 of conventional design includes circuitry for generating and maintaining an output signal when the roll error exceeds the given threshold level. The output signal from detector 66 is maintained until the roll error changes sign or roll error crosses 0°. The change in sign indicates that the control torque developed by torquer 74 has minimized the roll error. If the roll error is greater than a predetermined threshold level, the sense of the magnetic dipole that is developed by the magnetic torquer 74 is determined by the polarity sensor 68. The polarity sensor 68 determines the polarity of the current that should flow through the magnetic torquers 74 so as to produce the desired direction of the control torque.

Logic circuit 70 responsive to the output signals from both threshold detector 66 and error polarity 68 produces a control signal which indicates the appropriate polarity of the current to energize the magnetic torquer 74 such that the roll error is minimized. Torquer driver circuit 72 typically comprising either a current or a voltage source is suitably comprising either a current or a voltage source is suitably arranged to generate in response to signals from logic circuit 70, signals determining the appropriate current polarity for the magnetic torquer 74. The magnetic torquer 74 may be a single unit such as an air-core coil or an electromagnet or, due to mounting considerations, an array of units that produce magnetic dipoles whose vector sum results in the desired dipole magnitude and direction. Therefore, the sense of the current flowing through the magnetic torquer 74 is determined by the sense of the filtered roll error signal. For a more complete description on the magnetic attitude control system see the above cited U.S. Pat. Nos. 3,834,653 and 4,062,509 incorporated herein by reference.

In accordance with the present invention, the roll error signals from filter 64 are delayed before being applied to the threshold detector 66. The amount of delay is as discussed above. The amount of delay is such that the timing of the activation of the magnetic torquer 74 forces convergence of the nutation angle. The delay 65 is selected to guarantee that magnetic torque will act to reduce nutation rather than contributing to it. This delay is 163° plus the dipole skew angle as defined above. For example, a satellite with a 1 minute nutation period and the skew angle of the dipole being 76°, delay 65 delays the signals from filter 65 for $\frac{2}{3}$ of a nutation cycle or $\frac{2}{3}$ (60) or 40 seconds. The system might also include but does not require an optional sensor or logic 79 to determine the nutation period and adjust the delay 65 proportionately.

The delay 65 equally affects the threshold detector (66) and the polarity sensor (68), thus delaying both the turn-on and the turn-off of the magnetic torquer (74) by the same time increments.

Although the system described herein is discussed in connection with a satellite system in equatorial orbit, the principles are also applicable to satellites in high inclination orbits. It is well known to use magnetic torquers in satellites systems in high inclination orbits and by proper phasing of the control torques along the principle discussed herein, magnetic nutation damping can be provided while simultaneously controlling the roll/yaw attitude of the spacecrafts.

Figure 7:
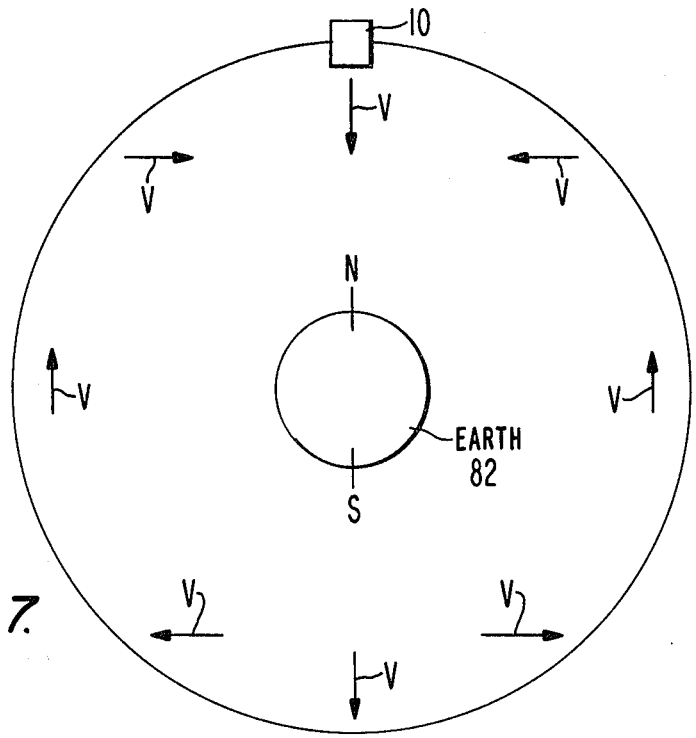
FIG. 7 illustrates the magnetic field vectors associated with satellites in high inclination orbits.

In the case of high inclination orbits such as those where the orbit plane is approximately (+20°) normal to the equatorial plane, the primary magnetic field vector (V) changes with position in orbit, as illustrated in FIG. 7, and therfore produce torque direction that change with position in orbit. The system would therefore include some means for adjusting the delay in delay 65 depending upon the position of the satellite in orbit. This could be provided by a clock and binary counter which sends a binary code to the delay where the time is detected and the delay is altered. This is in addition to the fractional delay discussed above.

Although the satellite system described herein is of the dual spin type, the present nutation control system is also applicable to all momentum bias satellites including spinning satellites. In the case of the spinning satellite in the equatorial orbit, correction for the spinning dipole is accomplished by commutating the direction of current through the dipole every half revolution of the spacecraft.

Although fractions (x) of a nutation period ($t_n$) delay are used in the above example, the same correction is accomplished if the delay is $(x+n)(t_n)$ delay, when n is an integer. For the example of a 1 minute nutation time period and the delay of 240/360(60) the same correction can be accomplished where the delay is 40 seconds plus any number of incremental nutation time periods such as 40 sec.+60 sec., 40+120 sec. 40+360 etc.

What is claimed is:

1. An integral magnetic torquing system for a planet orbiting momentum stabilized satellite for minimizing nutation of said satellite while automatically and simultaneously controlling the roll and yaw attitude error of the satellite, whereby the momentum is essentially along the pitch axis and the pitch axis is oriented to a desired attitude, comprising:

attitude error sensing means for generating a first output signal representing the magnitude and the polarity of the deviation of the pitch axis from a desired attitude;

magnetic torquing means suitably oriented in the body of said satellite for producing a magnetic dipole;

control signal generating means coupled to said sensing means for generating a first control signal delayed a predetermined time period after said first output signal exceeds a predetermined attitude error threshold and for generating a second control signal delayed said predetermined time period after said first output signal diminishes below a predetermined attitude error threshold;

said control signal generating means including delay means for delaying the generation of said first and second control signals for said predetermined time period, said period being proportional to the nutation period of the satellite, said delay means delays said period of time for a fraction of a nutation period or whole nutation cycle or cycles plus said fraction of a nutation period, said fraction being equal to D/360 where $D=\beta+\gamma$, where $\gamma$ is equal to the skew angle of the magnetic dipole in degrees from the roll axis, and $\beta$ is between 45 and 270; and energizing means responsive to said first control signal for energizing said magnetic torquing means and responsive to said second control signal for de-energizing said torquing means such that when energized, the magnetic field therefrom reacts with the magnetic field of the planet to produce a torque for reducing any satellite nutation and to simultaneously reduce roll and yaw attitude errors, thereby correcting deviation of said pitch axis from said desired attitude.

2. An integral torquing system for earth orbiting and three axis oriented pitch momentum bias dual spin type satellites for reducing nutation of a satellite while automaticaly and simultaneously controlling the roll error and yaw attitude error of the satellite, whereby the satellite is in a geosynchronous orbit, i.e., in the equatorial plane and the pitch axis is oriented to a desired attitude, comprising:

attitude error sensing means for generating a first output signal representing the magnitude and the polarity of the deviation of the pitch axis, from a desired attitude;

magnetic torquing means oriented in the body of said satellite to provide a magnetic dipole in the plane formed by said satellite's roll and yaw axes, said dipole being perpendicular to said satellite pitch axis and located in said plane;

control signal generating means coupled to said sensing means for generating a first control signal delayed a first predetermined time period after said first output signal exceeds a predetermined attitude error threshold and for generating a second control signal delayed a second predetermined time period equal to said first period, starting when the first output signal level reaches a predetermined attitude error threshold level;

said control signal generating means including a delay means for delaying the generation of said first and second control signals for said first predetermined time period, said period being proportional to the nutation period of the satellite, said delay means delays said period of time for a fraction of a nutation period or whole nutation cycle or cycles plus said fraction of a nutation period, said fraction being equal to D/360 where $D=\beta+\gamma$, where $\gamma$ is equal to the skew angle of the magnetic dipole in degrees from the roll axis, and $\beta$ is between 45 and 270; and energizing means responsive to said first control signal for energizing said magnetic torquing means and responsive to said second control signal for de-energizing said torquing means such that when energized, the magnetic field therefrom reacts with the magnetic field of the earth to produce a torque for reducing any satellite nutation and for simultaneously reducing roll and yaw attitude errors, thereby correcting deviation of said pitch axis from said desired attitude.

3. A method for reducing the nutation of a pitch momentum bias dual spin earth orbiting spacecraft having a magnetic torquing system of the type including torquing means to produce a magnetic dipole in the roll/yaw plane, an attitude error sensor, and energizing means for energizing said magnetic torquing system such that the magnetic field therefrom reacts with the magnetic field of the earth to produce a torque for reducing any roll and yaw errors and thereby any deviation of said pitch axis from said desired attitude, comprising the steps of:

sensing an error in the attitude of the spacecraft;

energizing said magnetic torquing system a predetermined fraction (x) of a nutation time period $t_n$ of the spacecraft or whole nutation cycle plus or whole nutation cycles plus said fraction after the sensed error exceeds a given threshold, said predetermined fraction $(x)=D/360$, where $D=\beta+\gamma$, where $\gamma$ is the skew angle of the magnetic dipole in degrees from the roll axis, and $\beta$ is between 45 and 270; and de-energizing said magnetic torquing system said same predetermined fraction of a nutation time period after said sensed error changes polarity.

4. The method of claim 3, wherein said roll error is sensed.

5. An integral magnetic torquing system for an earth orbiting and three axis oriented pitch momentum bias or dual spin type satellite for reducing nutation of said satellite while automatically and simultaneously controlling the roll error and yaw attitude error of the satellite, whereby the satellite is in a high inclination orbit and the pitch axis is oriented to a desired attitude, comprising:

attitude error sensing means for generating a first output signal representing the magnitude and the polarity of the deviation of the pitch axis from a desired attitude;

magnetic torquing means oriented in the body of said satellite for producing a magnetic dipole parallel to the satellite pitch axis;

means coupled to said sensing means for generating a first control signal delayed a predetermined time period after said first output signal exceeds a predetermined attitude error threshold and a second control signal said predetermined time period after said first output signal diminishes below predetermined attitude error threshold;

said control signal generating means including delay means for delaying the generation of said first and second control signal for said predetermined time period, said predetermined time period being equal to time $T=(D/360)(t_n)$ where T is time, $t_n$ is the nutation period of the satellite, D is $\beta+\gamma$ where $\gamma$ is the skew angle of the magnetic dipole from the roll axis and $\gamma$ is between 135 and 180 inclusive plus a function of the satellite's position in orbit; and energizing means responsive to said first control signal for energizing said magnetic torquing means and responsive to said second control signal for de-energizing said torquing means such that when energized, the magnetic field therefrom reacts with the magnetic field of the earth to produce a torque for reducing any satellite nutation and to reduce roll and yaw attitude errors, thereby correcting deviation of said pitch axis from said desired attitude.

6. An integral magnetic torquing system for a planet orbiting momentum stabilized satellite for minimizing nutation of said satellite while automatically and simultaneously controlling the roll and yaw attitude error of the satellite, whereby the momentum is essentially along the pitch axis and the pitch axis is oriented to a desired attitude, comprising:

attitude error sensing means for generating a first output signal representing the magnitude and the polarity of the deviation of the pitch axis from a desired attitude;

magnetic torquing means suitably oriented in the body of said satellite for producing a magnetic dipole;

control signal generating means coupled to said sensing means for generating a first control signal delayed a predetermined time period after said first output signal exceeds a predetermined attitude error threshold and for generating a second control signal delayed said predetermined time period after said first output signal diminishes below a predetermined attitude error threshold;

said control signal generating means including delay means for delaying the generation of said first and second control signals for said predetermined time period, said period being proportional to the nutation period of the satellite;

said delay means delays said period of time for a fraction of nutation period, that fraction being equal to D/360 where $D = \beta + \gamma$, where $\gamma$ is equal the skew angle of the magnetic dipole in degrees from the roll axis, and $\beta$ is between 135 and 180 inclusive; and energizing means responsive to said first control signal for energizing said magnetic torquing means and responsive to said second control signal for de-energizing said torquing means such that when energized, the magnetic field therefrom reacts with the magnetic field of the planet to produce a torque for reducing any satellite nutation and to simultaneously reduce roll and yaw attitude errors, thereby correcting deviation of said pitch axis from said desired attitude.

7. An integral magnetic torquing system for earth orbiting and three axis oriented pitch momentum bias dual spin type satellites for reducing nutation of a satellite while automatically and simultaneously controlling the roll error and yaw attitude error of the satellite, whereby the satellite is in a geosynchronous orbit, i.e., in the equatorial plane and the pitch axis is oriented to desired attitude, comprising:

attitude error sensing means for generating a first output signal representing the magnitude and the polarity of the deviation of the pitch axis from a desired attitude;

magnetic torquing means oriented in the body of said satellite to provide a magnetic dipole in the plane formed by said satellite's roll and yaw axes, said dipole being perpendicular to said satellite pitch axis, and located in said plane;

control signal generating means coupled to said sensing means for generating a first control signal delayed a first predetermined time period after said first output signal exceeds a predetermined attitude error threshold and for generating a second control signal delayed a second predetermined time period equal to said first period, starting when the first output signal level reaches a predetermined attitude error threshold level;

said control signal generating means including a delay means for delaying the generation of said first and second control signals for said first predetermined time period, said period being proportional to the nutation period of the satellite;

said delay means delays said period of time for a fraction of a nutation period, that fraction being equal to D/360 where $D = \beta + \gamma$, where $\gamma$ is equal the skew angle of the magnetic dipole in degrees from the roll axis, and $\beta$ is between 135 and 180 inclusive; and energizing means responsive to said first control signal for energizing said magnetic torquing means and responsive to said second control signal for de-energizing said torquing means such that when energized, the magnetic field therefrom reacts with the magnetic field of the earth to produce a torque for reducing any satellite nutation and for simultaneously reducing roll and yaw attitude errors, thereby correcting deviation of said pitch axis from said desired attitude.

8. The combination of claim 7, wherein said magnetic dipole produces a torque in the roll/yaw plane and wherein said delay means delays said period of time directly as a function of the skew angle of said magnetic dipole from the roll axis.

9. A method for reducing the nutation of a pitch momentum bias dual spin earth orbiting spacecraft having a magnetic torquing system of the type including torquing means to produce a magnetic dipole in the roll/yaw plane, an attitude error sensor, and energizing means for energizing said magnetic torquing system such that the magnetic field therefrom reacts with the magnetic field of the earth to produce a torque for reducing any roll and yaw errors and thereby any deviation of said pitch axis from said desired attitude, comprising the steps of:

sensing an error in the attitude of the spacecraft;

energizing said magnetic torquing system a predetermined fraction (x) of a nutation time period $t_n$ of the spacecraft after the sensed error exceeds a given threshold;

said predetermined fraction (x) = D/360 where $D = \beta + \gamma$, where $\gamma$ is the skew angle of the magnetic dipole in degrees from the roll axis, and $\beta$ is between 135 and 180 inclusive; and de-energizing said magnetic torquing system said same predetermined fraction of a nutation time period after said sensed error changes polarity.

* * * * *

UNITED STATES PATENT AND TRADEMARK OFFICE
CERTIFICATE OF CORRECTION

PATENT NO. : 4,424,948

DATED : January 10, 1984

INVENTOR(S) : Ludwig Muhlfelder et al.

It is certified that error appears in the above-identified patent and that said Letters Patent is hereby corrected as shown below:

Column 10, line 60 "$\gamma$" should be --- $\beta$ ---.

Signed and Sealed this

First Day of May 1984

[SEAL]

Attest:

GERALD J. MOSSINGHOFF

Attesting Officer

Commissioner of Patents and Trademarks